UNITED STATES PATENT OFFICE.

HENRI SCHNEIDER, OF LE CREUZOT, FRANCE.

PROCESS OF MANUFACTURING THE ALLOYS OF CAST-IRON AND COPPER.

SPECIFICATION forming part of Letters Patent No. 415,656, dated November 19, 1889.

Application filed December 3, 1888. Serial No. 292,519. (No specimens.)

*To all whom it may concern:*

Be it known that I, HENRI SCHNEIDER, manager of the firm Schneider & Cie., of Le Creuzot, (Saône-et-Loire,) in the Republic of France, manufacturers, have invented Improvements in the Process of Manufacturing the Alloys of Cast-Iron and Copper, of which the following is a specification.

This invention has reference to the manufacture on a commercial scale of cast or pig iron alloyed with copper.

It has long been known from laboratory experiments that copper imparts to iron and steel, when added thereto in the proper proportions, certain valuable properties; but no practical industrial method of combining these metals in the proper proportions has been heretofore discovered, so far as I am aware, and consequently the said alloys are unknown as industrial commodities.

Copper cannot be incorporated with iron or steel by direct admixture to form a homogeneous alloy; but I have discovered that this result can be attained by first incorporating the required quantity of copper in a thoroughly-fusible mass, (cast-iron being the metal employed,) throughout which copper is thoroughly diffused, this admixture or alloy being formed in a crucible, cupola, or open-hearth furnace. The copper cast-iron alloy may then be used as an ingredient in the manufacture of alloys of iron or steel and copper; but this manufacture forms the subject of another application, filed December 3, 1888, Serial No. 292,517, the present application being confined to the production of the copper cast-iron, whose use is not restricted to the manufacture of such iron and steel alloys.

In carrying out the present invention the furnace is charged with copper scrap and cast-iron mixed between layers of coke, or if a cupreous coke be employed then the cast-iron is laid in alternate layers with it, and a layer of anthracite is preferably laid over the whole. The alloy which is the product of the furnace contains, generally, from five to twenty per cent. of copper, according to the purpose for which it is to be employed, and it is remarkable for its great elasticity, strength, tenacity, and malleability—properties which may be still further developed by chilling or tempering.

I claim—

1. The herein-described process of manufacturing an alloy of cast-iron and copper by placing the iron and copper or cupreous material in the bed of a furnace and melting together, substantially as set forth.

2. The herein-described process of manufacturing an alloy of cast-iron and copper by charging a suitable furnace with iron, copper or copper compound, and carbonaceous matter under a layer of anthracite and melting together, as set forth.

3. The herein-described alloy of cast-iron and copper, containing said metals in approximately the proportions stated, said alloy being distinguished by homogeneity, malleability, and capacity for tempering, as set forth.

In testimony whereof I have signed my name to this specification in the presence of two subscribing witnesses.

HENRI SCHNEIDER.

Witnesses:
CHARLES BRÉNOY,
LÉON FRANCKEN.